UNITED STATES PATENT OFFICE.

MEYER L. RHEIN, OF NEW YORK, N. Y., ASSIGNOR TO LIZBETH E. VAN WYCK RHEIN, OF NEW YORK, N. Y.

DENTIFRICE.

1,297,494.     Specification of Letters Patent.     Patented Mar. 18, 1919.

No Drawing.     Application filed March 5, 1918. Serial No. 220,512.

*To all whom it may concern:*

Be it known that I, MEYER L. RHEIN, a citizen of the United States, residing at the city of New York, borough of Manhattan, county and State of New York, have invented a certain new and useful Dentifrice, of which the following is a specification.

Heretofore the efforts of dentists have been directed mainly, to repairing the destructive effect of caries upon the teeth, whereas the trend of the more recent practice is the prevention of all dental disease.

The teeth are normally bathed in a salivary solution, the mucin or mucinate of which tends to adhere tenaciously at different places on the enamel surface. Salivary mucin tends to form sticky mixtures containing countless bacteria and carbohydrates and other debris from the mouth, such mucin finding lodgment against the enamel surface in the form of a film or membrane, and sometimes contains mucin acid in solid or flake form, the same being commonly referred to in dentistry as bacterial plaques or "mucin plaques." In the initial stage, the presence of such mucin adhesions or plaques cannot be easily distinguished from the enamel surface of the teeth, the daily accretions of such mucin adhesions rendering the total removal thereof increasingly difficult. It has been established that the bacteria present in the mucin adhesion upon the enamel surfaces produce an acid which exerts decalcifying effects upon the enamel, and such enamel, when once destroyed, even to a minute extent, exposes the dentine to attack by the bacteria, producing caries. Accordingly, preventive dentistry is directed to keeping the enamel surface free, or to a material extent free, from such bacterial plaques and mucin adhesions, so as to preclude decay. The tenacity of the adhesion of bacterial plaques and mucin adhesions to the enamel surface varies according to the character and condition of the saliva in different individuals, but in practically all cases, the attachment is so firm and intimate that very considerable abrasive effort is required for the dislodgment of such plaques and adhesions.

Dentifrices are generally of an alkaline nature, for the reason that it has been sought to avoid bringing into contact with the teeth any agent capable of aiding decalification, the alkalinity of such dentifrices tending in a great measure to impair the efficiency thereof, more particularly as the media for the dislodgment of bacterial plaques and mucin adhesions. A weak acid solution has the effect of curdling the mucin film and of dislodging the plaques and adhesions from the enamel surface, but the well known decalcifying effect of some such acid solutions upon the enamel surface has acted heretofore as a deterrent to the use of any acids in dentifrices. In the present invention however an acid salt is employed as one ingredient of the new dentifrice for the purpose of curdling and detaching the "mucin plaques," under such conditions of use as to preclude all possibility to decalcification arising from the presence of such salt on the teeth.

In order to detect the presence or absence of mucin adhesions, either as a film or membrane or as an acid in flaky condition, resort is frequently had by dentists to a disclosing solution, composed usually of iodin in a weakened condition, the application of which to teeth whereon mucin is present tends to impart to such mucin adhesions the characteristic yellow color of the iodin solution, whereas such application to teeth free from mucin adhesions has no perceptible effect so far as concerns discoloration of the enamel surface.

According to this invention it is sought to dislodge the bacterial plaques and mucin adhesions, the latter being present either as a film or gelatinous membrane, or heterogeneous deposit, by the action of an acid salt acting to flocculate and dislodge such adhesions.

The dentifrice combines with the acid salt a certain basic agent, preferably sodium bicarbonate which, in the presence of moisture, reacts with the acid salt to set free bubbles of carbon dioxid gas in contact with the enamel surface, which gas in connection with an abrasive agent afforded by one or more ingredients of the dentifrice, precludes a too long application to the enamel surface of such acid salt. The action of the acid upon the teeth is followed immediately by, or attended simultaneously with, the production of an alkaline medium afforded by the solution of certain alkaline salts, supplemented by the naturally alkaline saliva, the flow of which is perceptibly increased by the action upon the salivary glands of the acid salt employed primarily as the means for flocculating and dislodging the mucin adhesions.

Experience shows that the presence of acids in the mouth very materially increases both the amount and alkalinity of saliva and, further, that weak solutions of certain forms of acid are efficacious in flocculating and dislodging mucin adhesions upon the teeth. The stimulation by acids of the salivary flow is an important function obtained by the employment in my dentifrice of an acid salt, and as such flow continues for an appreciable length of time after completing the operation of brushing the teeth, it is apparent that the teeth are bathed in the saliva the flow and alkalinity of which are increased so as to neutralize the effect of the acid solution upon the enamel, and to exert a neutralizing and cleansing effect in the mouth for a considerable period afterward, thereby precluding deleterious manifestations upon the enamel surface exhibited by erosion or disintegration.

Another important feature of the invention is an alkaline salt effervescent in character when decomposed by reaction with the acid salt and generating in the mouth carbon dioxid gas acting primarily by its effervescence to carry the acid solution away from contact with the teeth, said gas acting also as an agent to effect disintegration of the mucin plaque and said gas being not only harmless in its action upon the enamel surface and the tissues but possessing prophylactic properties in the mouth.

The soluble alkaline salt which it is preferred to employ is bicarbonate of soda, the same being supplemented by other alkaline agents, such as precipitated calcium carbonate and sodium oleate. The specified alkaline agents, singly or in combination, afford an abrasive the action of which is comparatively mild and which is also, mildly alkaline, the quantity of the alkaline solution artificially produced by such agents augmenting the alkalinity of the saliva which is, as before stated, increased by the stimulating action of the acid solution upon the salivary glands. Another function of the alkaline solution produced artificially in the mouth by the decomposition of the alkaline salts is to neutralize any destructive (e. g. lactic) acid resulting from the presence in the mouth and in the interdental spaces of organisms resulting from food fermentation.

The froth evolved by the solution and agitation of the sodium oleate tends to fortify the effervescent effect produced by the reaction of the acid salt with the sodium bicarbonate, and such soapy froth acts, also, to dislodge from the teeth such forms of the slimy film as are due to fatty matters derived from food fermentation.

The dentifrice is in the form either of a dry powder or of a paste, the acid salt and the alkaline salts being in the latter case (paste form) incorporated by the addition of a neutral water-free agent, such as glycerin or any concentrated gummy substance, like gum arabic, practically free from water, whereby the alkaline agents and the acid salt are restrained from decomposition or until introduced into the mouth so as to become activated by the water in the saliva.

The composition is as follows, although it is to be distinctly understood that the proportions may be changed in substantial particulars without departing from the spirit of the invention:—

| | |
|---|---|
| Calcium carbonate (precipitated chalk) | 34 lbs. |
| Bicarbonate of soda | 4 " |
| Sodium oleate | 4 " |
| Potassium bitartrate | 8 " |
| Saccharin | 10 grs. | and suitable flavoring agents such as—

| | |
|---|---|
| Oil of gaultheria | 18 oz. |
| Oil of peppermint | 9 " |

In the above formula, the quantities specified are for a mass aggregating in weight fifty pounds (50 lbs.); but of course any desired quantity may be prepared, the specified proportions being usually retained. The compounding of the mass is carried out in any preferred way, the flavoring agents being incorporated and the ingredients intimately mixed mechanically to produce an impalpable powder.

Although I have stated that potassium bitartrate is used as the acid salt, it is to be distinctly understood that the invention is not restricted to this particular substance, for the reason that I may employ other acid salts performing the functions herein specified, such e. g. as acid sodium citrate, and others obtainable from fruits. It is preferred to employ potassium bitartrate for several reasons among which are its capacity as an active salivary stimulant, it has an agreeable taste, it is widely distributed in nature and to which the salivary glands have by the process of evolution been adapted, and its solubility is only 1 in 200 of water so that when employed in solution there should be no danger of its being used in such strength as to decalcify the enamel surface.

The addition of the acid salt in a weak solution to the saliva causes the latter to become watery and well adapted to flowing and percolating between the teeth and into fissures and grooves. Moreover, should the acid remain in the saliva, it undergoes neutralization, so that in the extremely unlikely case of any acid remaining unneutralized in the mouth at the completion of the operation of brushing the teeth, it would rapidly become progressively less acid in the presence of the saliva, and finally neutral.

The calcium carbonate and the sodium oleate in addition to their functions as alkaline agents furnish a mild abrasive in the operation of brushing the teeth, and, furthermore, the froth due to solution and agitation of the sodium oleate tends to penetrate the interdental cavities so as to dislodge from the teeth such slimy films as are due to fatty matters derived from food. It is apparent that the group of specified alkaline agents when decomposed in the mouth produce a solution of mild alkalinity, the main function of which artificial alkaline solution is to neutralize the effect of the acid solution subsequent to the action of the latter in flocculating and precipitating the mucin film, in which particular the neutralization of the acid is carried forward by the alkalinity of the saliva, the presence of which in increased volume is physiologically advantageous, and the flow of which is stimulated and rendered watery by the action upon the salivary glands of the weak acid solution.

It is apparent that the dentifrice, either as a dry powder or as a paste, should be carried in the required limited quantity by a brush to the teeth, and applied by vigorously brushing, suitable moisture being utilized either by dampening the brush or by the addition of saliva, or both, so as to effect reaction between the acid salt and the bicarbonate of soda to thereby generate bubbles of carbon dioxid gas, and concurrently therewith to produce a soapy froth. The decomposition of the acid salt and of the required moisture produces a mutual reaction according to the general formula:—

Tartrate $KH + NaHCO_3 =$ Tartrate $KNa + H_2O + CO_2$.

The production artificially of the harmless carbon dioxid gas in contact with the teeth brings into action a very weakly acid agent which by its effervescence carries out of contact with the teeth the acid solution, and the curds from the mucin plaques such effervescent action in connection with the froth operating, mainly, materially to decrease the length of time during which the acid solution will remain active in contact with the teeth, and concurrently with such activation of the acid solution and the alkaline agents, the weak acid solution stimulates the flow of saliva, the latter bathing the enamel surface with an alkaline agent tending to further neutralize the acid action upon such enamel surface for a considerable period following the application of the dentifrice.

From what has been said it is apparent that the function of the acid salt is, primarily, to generate a weak acid solution which curdles or flocculates the slimy mucin film or gelatinous membrane and dislodges the same from contact with the enamel surface, and, secondarily, such acid solution stimulates the salivary glands so as to result in the flow of saliva increased materially in amount and alkalinity the effect of which is to neutralize the acid solution and to carry forward this process for a considerable period subsequent to the application of the dentifrice. Furthermore, the other specified agents are affected concurrently with the acid salt, so as artificially to produce bubbles of gas in contact with the teeth and a soapy froth, due to agitation, which artificially result in a solution which is initially weakly acid and which becomes ultimately alkaline in its properties and the action of which mixture is promptly to neutralize the excess of the acid beyond that required to flocculate the mucin plaque, and which in conjuction with the natural alkaline agent afforded by the saliva, furnishes a liquid which circulates freely through the interdental spaces.

Although alkaline agents in a dentifrice act usually as a salivary depressant, in my invention the specified tendency is counteracted by the action of the acid solution in stimulating the flow of saliva at the time of and subsequent to the period of application to the teeth and, moreover, the salivary stimulation is enhanced by the addition of oil of gaultheria and oil of peppermint as the flavoring agents. The dentifrice is agreeable to the taste, for the reason that the potassium bitartrate which I preferably use is well adapted to the salivary glands, and such dentifrice is sweetened by the addition of saccharin. Furthermore, the dentifrice is harmless in the mouth, and no harm results should it be swallowed in even fairly large quantities.

Having thus fully described the invention, what I claim as new, and desire to secure by Letters Patent is:

1. A dentifrice including an acid salt combined with an alkaline agent mutually reactive in the presence of moisture to produce an effervescent gas and an initially weak acid solution in contact with the teeth, the latter solution acting primarily to dislodge mucin adhesions from the enamel surface and the effervescent gas tending to aid in such dislodgment of the mucin and to carry away the acid solution from contact with the enamel surface, whereby the period of acid activity is so limited in duration as to preclude enamel decalcification and a final reactive alkaline condition in the mouth is attained.

2. A dentifrice including an organic acid salt combined with an alkaline agent mutually reactive in the presence of moisture to produce an effervescent gas and an initially weak acid solution in contact with the teeth, the latter solution acting primarily to dislodge mucin adhesions from the enamel surface and the effervescent gas tending to aid in such dislodgment of the mucin and to carry away the acid solution from contact with the enamel surface, whereby the period of acid activity is so limited in duration as to preclude enamel decalcification and a final reactive alkaline condition in the mouth is attained.

3. A dentifrice including potassium bitartrate and an alkaline agent mutually reactive in the presence of moisture to produce an initially weak acid solution and an effervescent gas in contact with the teeth, said weak acid solution acting initially to dislodge mucin adhesions from the enamel surface and the effervescent gas tending to aid in such dislodgment of the mucin and by its disappearance to facilitate the attainment of a final reactive alkaline condition in the mouth.

4. A dentifrice including an organic acid salt combined with bicarbonate of soda mutually reactive in the presence of moisture and producing an initially weak acid solution and an effervescent gas, the latter agent tending to shorten the period of activity of the acid solution in contact with the enamel surface and by its disappearance to facilitate the attainment of a final reactive alkaline condition in the mouth.

5. A dentifrice embodying potassium bitartrate and bicarbonate of soda mutually reactive in the presence of moisture and resulting in an initially weak acid solution acting to flocculate mucin adhesions on the enamel surface and an effervescent gas, the latter tending to aid in the dislodgment of such mucin adhesions and by its disappearance to facilitate the attainment of a final reactive alkaline condition in the mouth.

6. A composition for a dentifrice comprising potassium bitartrate, bicarbonate of soda and calcium carbonate in substantially the proportions specified, said acid ingredient being reactive with the said basic ingredients in the presence of moisture and producing an initially weak acid solution and an effervescent gas, said acid solution and the effervescent gas mutually contributing to the dislodgment of mucin adhesions from the enamel surface and the effervescent gas by its disappearance tending to facilitate the attainment of a final reactive alkaline condition in the mouth.

7. A composition for a dentifrice comprising potassium bitartrate, bicarbonate of soda, calcium carbonate, sodium oleate, and a suitable flavoring in substantially the proportions specified; said acid ingredient being mutually reactive with said basic ingredients in the presence of moisture so that the solution of the acid ingredient produces an initially weak acid solution, the function of which is to dislodge mucin adhesions, whereas the partial decomposition of the basic ingredients results in the production of an effervescent gas which contributes to the dislodgment of mucin adhesions and which by its disappearance tends to facilitate the attainment of a final reactive alkaline condition in the mouth.

8. A composition for a dentifrice comprising potassium bitartrate, bicarbonate of soda, calcium carbonate, sodium oleate and saccharin in substantially the proportions specified, said acid ingredient being mutually reactive with the basic ingredients in the presence of moisture to the end that the acid ingredient produces an initially weak acid solution adapted to flocculate mucin adhesions upon the enamel surface whereas the specified basic ingredients yield an effervescent gas which contributes to the dislodgment of such mucin adhesions and by its disappearance tends to facilitate the attainment of a final reactive alkaline condition in the mouth.

9. A composition for a dentifrice comprising potassium bitartrate, bicarbonate of soda, calcium carbonate, sodium oleate, saccharin, and a suitable flavoring in substantially the proportions specified, said acid ingredient being mutually reactive with the specified basic ingredients in the presence of moisture to the end that the solution of the acid ingredient produces an initially weak acid solution adapted to flocculate mucin adhesions upon the enamel surface whereas the decomposition of the specified basic ingredients results in an effervescent gas which contributes to the dislodgment of such mucin adhesions and by its disappearance facilitates the attainment of a final reactive alkaline condition in the mouth.

10. A composition for a dentifrice in paste form comprising potassium bitartrate, bicarbonate of soda, calcium carbonate, sodium oleate, a suitable flavoring, and a neutral water-free agent such as glycerin in substantially the proportions specified, said acid ingredient being mutually reactive with the specified basic ingredients in the presence of moisture to the end that the solution of the acid ingredient produces an initially weak acid solution adapted to flocculate the mucin adhesions upon the enamel surface, whereas the decomposition of the specified basic ingredients results in an effervescent gas which contributes to the dislodgment of such mucin adhesions, shortens the period of activity of the acid solution in contact with the enamel surface, and by its disappearance tends to facilitate the attainment of a final reactive alkaline condition in the mouth.

11. A dentifrice including an acid salt and basic salts mutually reactive in the presence of moisture to produce an initially weak acid solution and ultimately a weak alkaline solution, said weak acid solution acting to dislodge mucin adhesions from the enamel surface and to stimulate salivary flow, whereas the superseding alkaline solution contributes to such dislodgment of the mucin adhesions and acts to neutralize the initially weak acid solution and to attain a final reactive alkaline condition in the mouth.

In testimony whereof I have hereunto signed my name this 4th day of March 1918.

MEYER L. RHEIN.